US006392854B1

(12) United States Patent
O'Gorman

(10) Patent No.: US 6,392,854 B1
(45) Date of Patent: May 21, 2002

(54) METHOD AND SYSTEM FOR TESTING CONTINUITY OF A MOTOR AND ASSOCIATED DRIVE CIRCUITRY

(75) Inventor: Patrick A. O'Gorman, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 42 days.

(21) Appl. No.: 09/627,209

(22) Filed: Jul. 27, 2000

(51) Int. Cl.[7] ................................................. H02H 5/04
(52) U.S. Cl. .............................. 361/31; 361/78; 701/48; 180/443
(58) Field of Search .............................. 361/23, 31, 78, 361/87; 180/400, 443; 701/41, 43, 48, 36; 324/612, 512, 522; 307/10.1, 10.6, 116

(56) References Cited

U.S. PATENT DOCUMENTS

| | | | | |
|---|---|---|---|---|
| 4,984,647 A | * | 1/1991 | Morishita et al. | 180/404 |
| 5,414,627 A | * | 5/1995 | Wada et al. | 180/446 |
| 5,642,247 A | * | 6/1997 | Giordano | 318/434 |
| 6,056,384 A | * | 5/2000 | Sato et al. | 318/439 |
| 6,226,580 B1 | * | 5/2001 | Noro et al. | 180/443 |

\* cited by examiner

Primary Examiner—Kim Huynh
(74) Attorney, Agent, or Firm—Gary J. Cunningham; Steven A. May

(57) ABSTRACT

A method and system for checking continuity of a motor 104, motor drive, motor relay 110, dc relay 108 and interconnections 122a–c thereof for a power steering system 204. The method and system of the invention produce minimal torque on a motor shaft 426 of the power steering system 204. The position of the motor shaft 426 is located using a Hall effect current sensor 114, a resolver and the like, depending on the type of motor. Thereafter, it is determined which switches 106a–f of an inverter circuitry 100 to switch to produce a minimal torque on the motor shaft 426. The inverter circuit 100 converts dc voltage from a power source 102 to ac voltage required by the motor 104. Thereafter, the switches 106a–f that produce the minimal torque on the motor shaft 426 are switched and current flow is checked to determine the continuity of the circuitry. To produce minimal torque on the motor shaft 426, the complementary pair of switches 106a–f to the first pair is then switched.

18 Claims, 8 Drawing Sheets

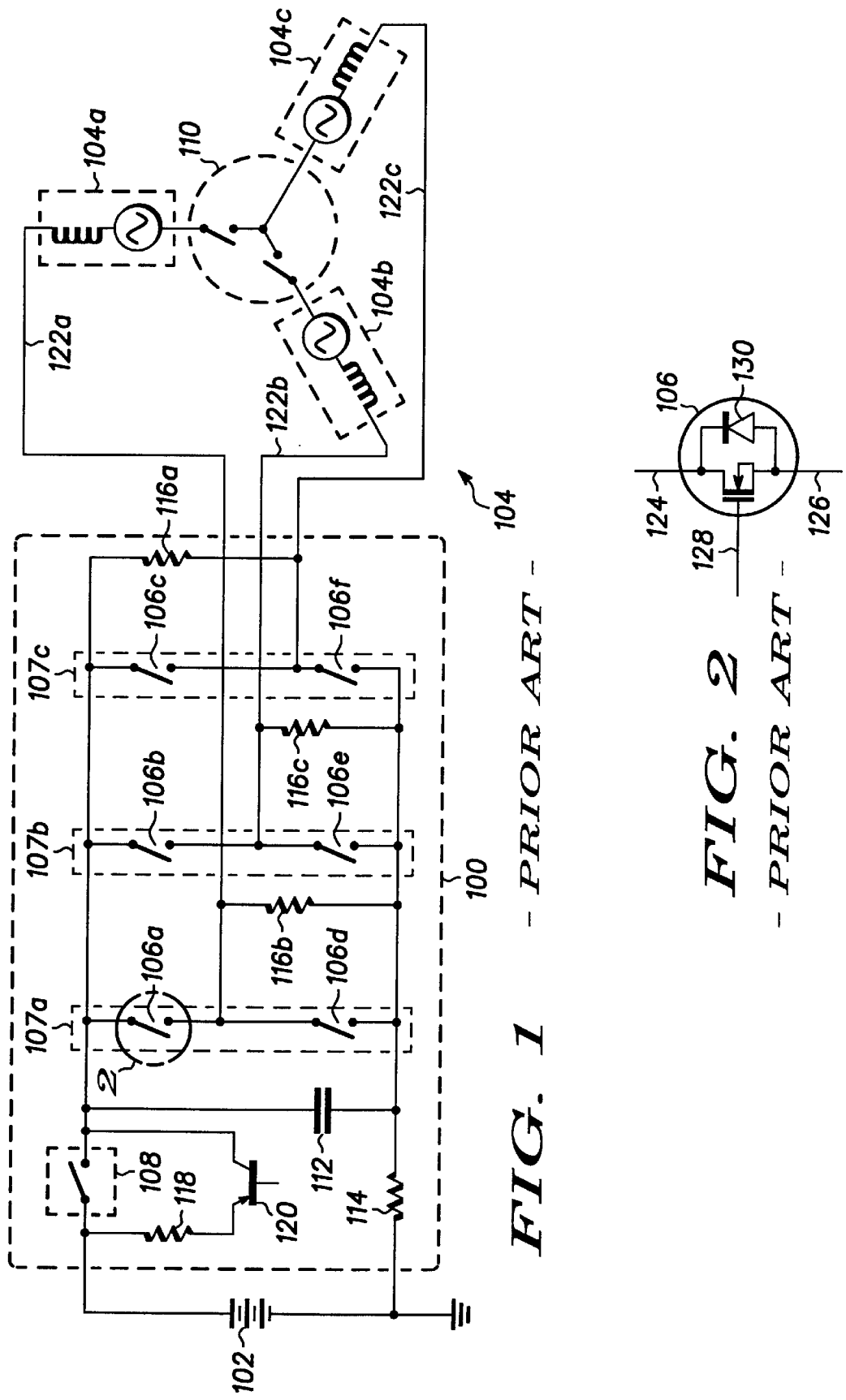
FIG. 1 – PRIOR ART –
FIG. 2 – PRIOR ART –

| 001 | B- C+ [cw]<br>B+ C- [ccw] |
|---|---|
| 011 | A- C+ [cw]<br>A+ C+ [ccw] |
| 010 | A- B+ [cw]<br>A+ B- [ccw] |
| 110 | C- B+ [cw]<br>C+ B- [ccw] |
| 100 | C- A+ [cw]<br>C+ A- [ccw] |
| 101 | B- A+ [cw]<br>B+ A- [ccw] |

METHOD AND SYSTEM FOR TESTING CONTINUITY OF A MOTOR AND ASSOCIATED DRIVE CIRCUITRY

FIELD OF THE INVENTION

This invention, generally, relates to motor aided systems and, more particularly, to motor aided power steering systems.

BACKGROUND

Drivers steer automobiles through a system of gears and linkages that transmit the turning motion of a steering wheel to a vehicle's front wheels. As vehicle designs shift weight to the front wheels to improve riding comfort and vehicle handling, more effort is needed to turn the front wheels and provide sufficient torque to overcome the drag that exists between the front wheels and the road.

Power steering systems are designed to reduce steering effort and improve maneuverability of the vehicle. Some vehicles use engine driven hydraulics to amplify the torque applied by the steering wheel to the front wheels. In such a system, a mechanically or an electrically driven pump maintains a hydraulic fluid, such as oil, under pressure. The rotation of the steering wheel actuates a valve, which supplies or drains fluid to a power cylinder as needed to reduce the steering effort necessary to turn the wheels. A problem exists with the hydraulic system, however, in that, if the hydraulic system fails, the driver must steer the fluid that couples the steering wheel to the front wheels, in addition to overcoming the drag between the wheels and the road. Moreover, the hydraulic system necessitates extra parts such as belts, hoses and pumps because the hydraulic system cannot directly couple to the steering shaft.

To avoid problems that accompany the hydraulic system, some vehicles directly couple an electric motor to the steering shaft through a gearbox. In one example, a three-phase alternating current (ac) motor is used and the three-phase voltage required to operate the motor from the vehicle's direct current (dc) battery is obtained using a three-phase inverter connected between the dc battery and the motor. For safety reasons, relays are used to ensure fail-safe operation in case of the inverter faults. For example, one relay disconnects the battery from the inverter's switches while another relay closes to form a neutral point of the three-phase motor.

BRIEF DESCRIPTION OF THE DRAWINGS

FIG. 1 is a schematic diagram of a known three-phase inverter circuit according to the prior art;

FIG. 2 illustrates an equivalent MOSFET circuit diagram of a switch shown in FIG. 1.

DETAILED DESCRIPTION OF THE PREFERRED EMBODIMENTS

Figure 3:
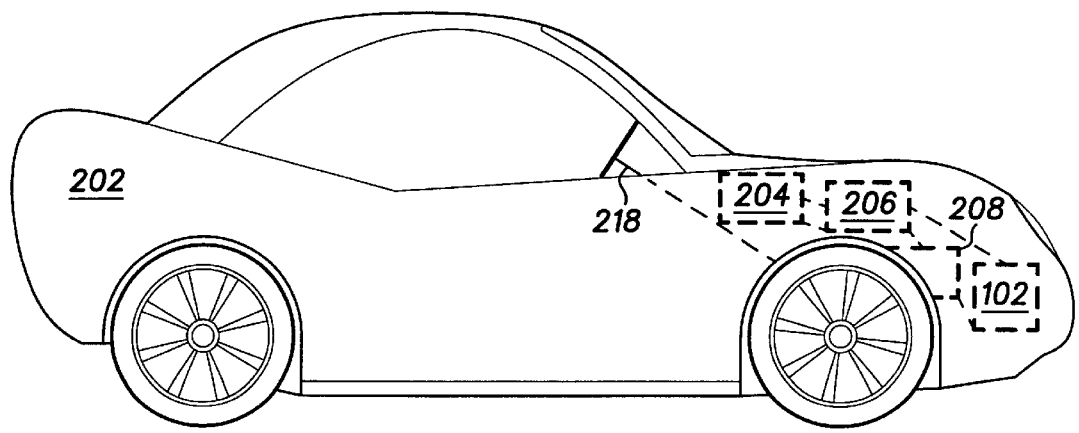
FIG. 3 illustrates a side view of a vehicle incorporating a test method and system in accordance with the invention.

Power steering systems are designed to reduce the torque required to turn the wheels of a vehicle, especially at low speeds. To make steering easier, many power steering systems use an electric current motor that amplifies the torque applied to the steering wheel to turn the front wheels of the vehicle. To power the motor, the system includes a three-phase inverter with switches that operate to convert dc voltage of the vehicle's battery to the ac voltage used by the motor.

For safety reasons, the system often utilizes relays, for example, to ensure fail-safe operation of the steering system in case of a motor or inverter fault. Preferably, one relay is placed in the dc rail, e.g., a dc relay, which disconnects the battery from the inverter power switches, and another relay, e.g., a motor relay, closes to form the neutral or star connection point of the motor. The disclosed method and system detects dc battery current to check the continuity of the motor and motor drive system and/or the continuity of the motor relay upon powering up the vehicle. The method and system may also be used to verify the continuity of the dc relay. The method and system can be easily integrated or interfaced to any front, rear, or all wheel drive power steering system that uses a direct or an alternating current motor. According to the present method and system, to ensure that relays operate correctly, the operation of the relays is preferably checked as part of a vehicle power-up sequence and prior to providing steering assist to the driver. Those skilled in the art will appreciate that the method and system described herein may be used in other applications, such as, electric power brakes and electronic throttle control.

Referring to the drawings, and particularly FIG. 1, an inverter circuit 100 is shown connected between a power source 102 and a motor 104 (represented by its equivalent phases 104*a–c*) for assisting the vehicle's steering. The inverter circuit 100 includes switches 106*a–f*. An exploded view of the switches 106*a–f* is shown for switch 106*a*. Preferably, the switches 106*a–f* operate as a transistor/diode pair. An exemplary transistor is a Metal-Oxide-Semiconductor-Field-Effect-Transistor (MOSFET), which includes a diode 130. If another type of transistor is used which does not include the diode 130, the diode 130 is added externally.

Referring also to FIG. 2, switch 106*a* is shown with the equivalent circuit diagram of a MOSFET, where the positive current is controlled by energizing terminal 128 to allow current to flow in the direction of terminal 124 to terminal 126, commonly referred to as the positive direction. Current in the direction of terminal 126 to terminal 124, commonly referred to as the negative direction, is not under control of the switch through terminal 126 but flows through the diode 130. Consequently current in the positive direction is under switch control but negative current is not controlled.

Typically, the power switches 106a–f are arranged in a three-phase inverter configuration using three inverter legs 107a–c. In this configuration, two power switches are disposed in series between the power source 102 and ground. Preferably, a maximum of three switches can be turned on at one instant, with only one switch being active per inverter leg. The three inverter legs 107a–c connect with the motor phases 104a–c via interconnecting leads 122a–c.

The circuitry also includes relays such as a dc relay 108 that connects with the power source 102 and a motor relay 110 that forms the motor neutral-point connection. The battery return line includes a current sense resistor 114 to convert the battery's return current to a representative voltage. The current sense resistor 114 is chosen at a sufficiently large value to allow the detection of relatively low currents but a sufficiently small value so that excessive power dissipation does not occur at relatively large battery currents.

The circuitry also includes a capacitor 112 that provides a momentary, e.g., in the order of microseconds, surge of current to the circuitry when the switches 106a–f change state from on to off, and vice versa. The capacitor 112 operates as a local source and sink of energy and is preferably located as close as possible to the switches 106a–f, whereas the battery 102 may be remotely located. To allow the capacitor 112 to charge up slowly before the switches 106a–f are closed, the circuitry also includes a resistor 118 and transistor 120 combination connected in parallel across the dc relay 108 contacts. At power up, the transistor is closed and voltage across the capacitor 112 is monitored until a determined level close to the battery voltage is reached. Thereafter, the transistor 120 is opened and the relay 108 is closed. Without resistor 118 and transistor 120 combination, a large current surge, typically on the order of a few hundred Amperes, would flow through the discharged capacitor 112, dc relay 108 and sense resistor 114 when the relay 108 is closed, which could lead to long term relay contact damage and electromagnetic interference problems with other electronic components in the vehicle.

A known way of checking the motor relay 110 includes adding to the circuitry pull-up and/or pull-down resistors 116a–c as shown in FIG. 1, preferably of equal value. To perform the test, a voltage must exist across the capacitor 112, which may be applied through the resistor 118 and transistor 120 combination or by closing the dc relay 108. To determine the proper operation of the motor relay 110, voltage may be read at the neutral point of the motor 104, which is not accessible, however, in many applications. When both contacts of motor relay 110 are open, the neutral point voltage is equal to the voltage of capacitor 112. When one contact is closed, however, the neutral voltage is half the voltage of capacitor 112 if all the resistors 116a–c are of equal value. In addition, when both contacts are closed, the neutral point voltage is one-third the voltage of capacitor 112 if all the resistors 116a–c are of equal value.

In addition, resistors 116a–c, which are only required during power-up, increase the cost of the circuitry and add unwanted power dissipation to the circuitry. Also, in many systems, if the operator turns the steering wheel during the power-up relay test, a back electro-motor-force (EMF) is created which corrupts the relay check and could result in a false determination of continuity failure and a consequent disabling of the power steering for that trip.

Figure 4:
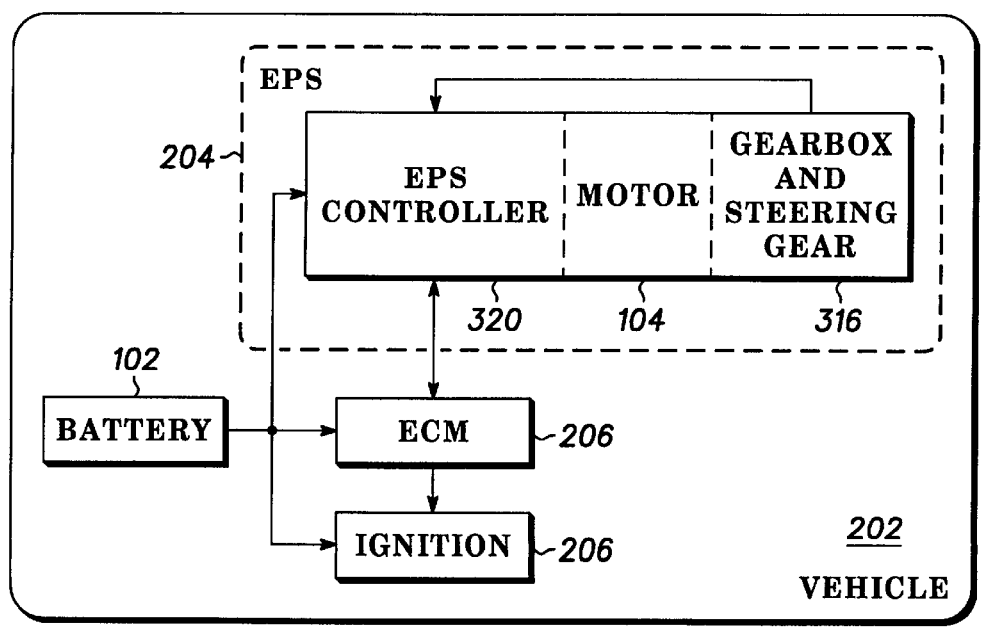
FIG. 4 is a partial block diagram of the system shown in FIG. 3 arranged in accordance with the invention.

Referring to FIGS. 3 and 4, a vehicle 202 is shown of which the method and system of the preferred embodiments can be used. The vehicle 202, which is any device that transports people and/or things, preferably includes an electronic power steering system 204 (EPS), an electronic control module 206 (ECM), an ignition module 208, and the power source or battery 102. The electronic power steering system 204 includes an electronic power steering system controller 320, the motor 104, and a gearbox 316. The gearbox 316 has a plurality of toothed wheels (gears) coupled between the steering column 218 and the motor 104. The gears operate to transmit and modify the rotary motion and torque of the motor 104 to the steering column 218. The electronic control module 206 is a microcomputer that monitors and controls the driveability and emission functions of the vehicle's engine.

Figure 5:
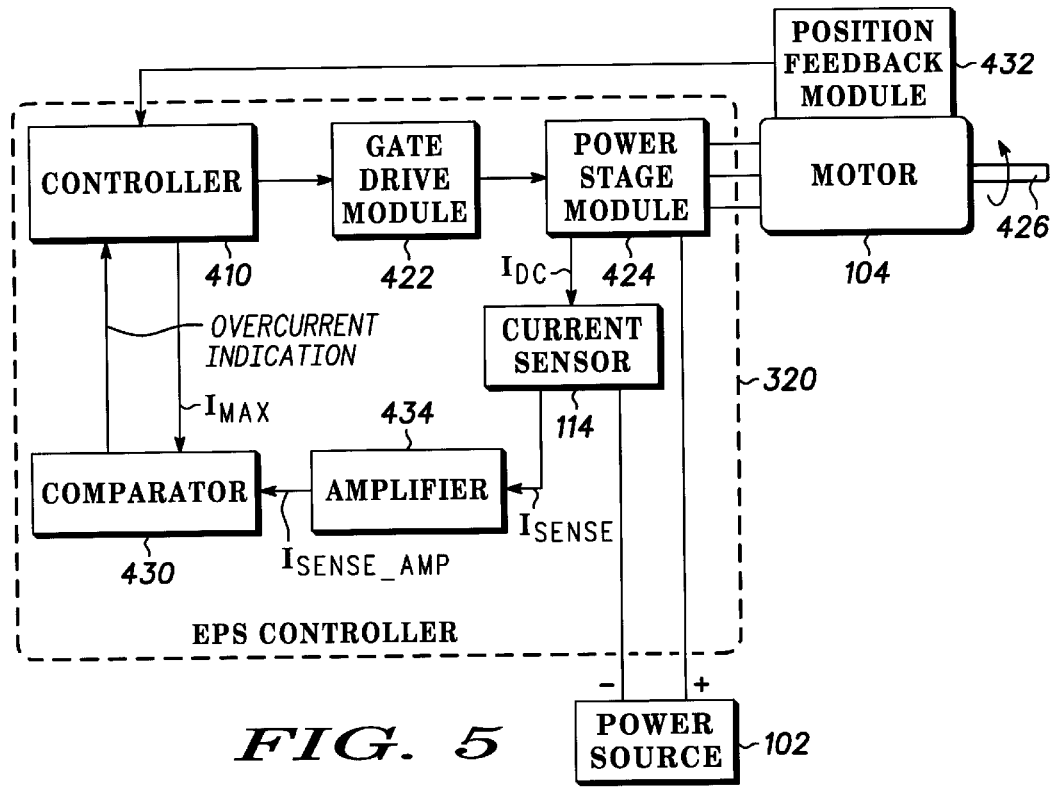
FIG. 5 is a block diagram of an electronic power steering system controller of FIG. 4 arranged in accordance with the invention.

As illustrated in FIG. 5, the electronic power steering system 204 includes the electronic power steering system controller 320 and the power source 102, the motor 104 and a position feedback module 432. The position feedback module 432 preferably monitors a position of the motor shaft 426. The electronic power steering system controller 320 further includes a controller 410, a gate module 422, a power module 424, the current sensor 114, an amplifier 434 to amplify the signal from the current sensor 114 and a comparator 430.

Figure 6:
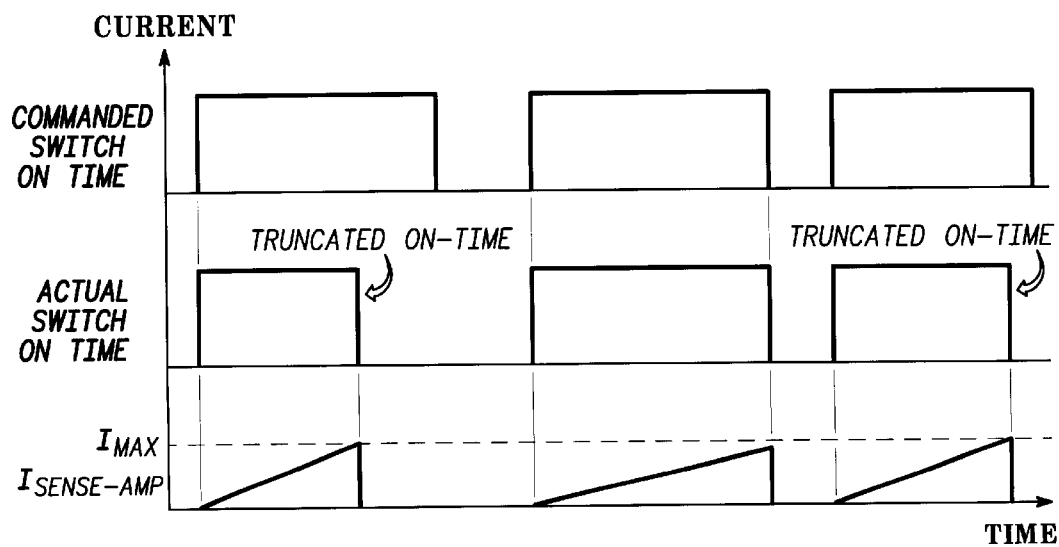
FIG. 6 is a signal diagram of a sensed current and signal pulse versus time in accordance with the invention.

Referring also to FIG. 6, in one example, the comparator 430 detects when a determined current threshold, $I_{max}$, has been exceeded and indicates the event by inverting the comparator output logic level. The inverted output logic level signal is fed to the controller 410 which maintains the switches 106a–f in the off position until the beginning of the next switching cycle. Thereafter, regular switching on/off patterns are resumed. Those skilled in the art commonly refer to the above-described comparator operation as a pulse-by-pulse current limit.

The controller 410 establishes the switching sequence of the six switches 106a–f (see FIG. 1) found in the power module 424. The switching sequence establishes the desired frequency and amplitude of the motor current. Preferably, the controller 410 generates six digital pulses, one digital pulse for each power switch. The gate module 422 receives the digital pulses and generates six outputs capable of driving a peak current on the order of 1 Ampere. Preferably, a peak current of 1 Ampere is sufficient to turn on and turn off the power switches rapidly, thereby improving the efficiency of the power module 424.

The battery current sensor 114 is disposed in series between a negative battery terminal or ground and the power module 424, of course other locations could be used. For example, the current sensor 114 may also be disposed in series between a positive battery terminal and the power module 424. The current sensor 114 measures bidirectional current, and preferably, consumes little power. The output of the current sensor 114 is preferably fed to an amplifier 434 that feeds the amplified output to the comparator 430. The position feedback module 432 measures the rotation of the motor shaft 426 and generates signals that indicate shaft 426 position. Signals from the position feedback module 432 are fed to an input of the controller 410.

The position feedback module 432 tracks motor shaft rotation using, for example, a resolver, a modulated light signal and a photoelectric quadrature encoder or Hall effect position sensors. In a photoelectric encoder, a slotted code wheel interrupts the beam of light at a frequency that correlates to the rotation of the shaft 426. The portion of light passing through the code wheel slots is detected and then converted into electrical signals that are sampled by known analog or digital circuitry to determine the angular speed, the direction of rotation, and the angular position of the shaft 426. The required accuracy of the position feedback module 432 will depend on the application of the invention, but for the purpose of this exemplary embodiment, a one degree electrical resolution is suggested.

Figure 7:
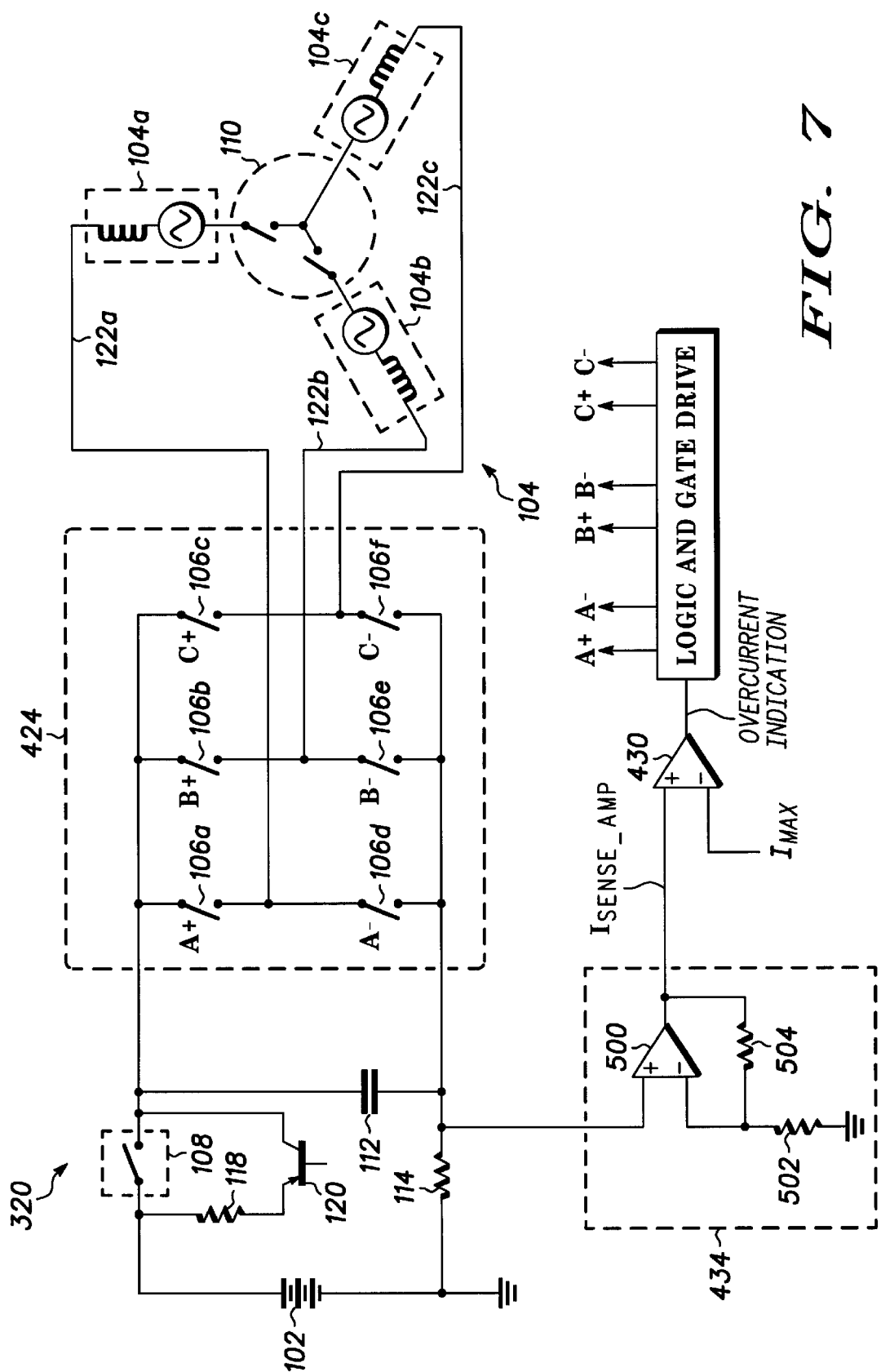
FIG. 7 is a partial schematic diagram of the electronic power steering system shown in FIG. 5.

FIG. 7 illustrates a partial functional diagram of the electronic power steering system 204 illustrating the power source or battery 102, the current sensor 114, a portion of the power module 424, and an equivalent circuit representation of the motor 104. The motor 104 is illustrated in a simplified wye-configuration that includes a balanced back electromotive force and a balanced line inductance. Although a wye-configuration is shown, delta-configurations can also be used in alternative exemplary embodiments.

Preferably, the current sensor 114 is a precision resistor disposed between the power module 424 and ground. The series resistor may be coupled to the amplifier 434 to increase the output signal strength. An exemplary amplifier includes an operational amplifier 500 and resistors 502, 504. In other exemplary embodiments, the Hall effect current sensor is used in addition to the Hall sensor used to detect motor position. The additional Hall effect current sensor provides a relatively noise immune signal, consumes little power, and does not interrupt or attenuate current flow.

Figure 8:
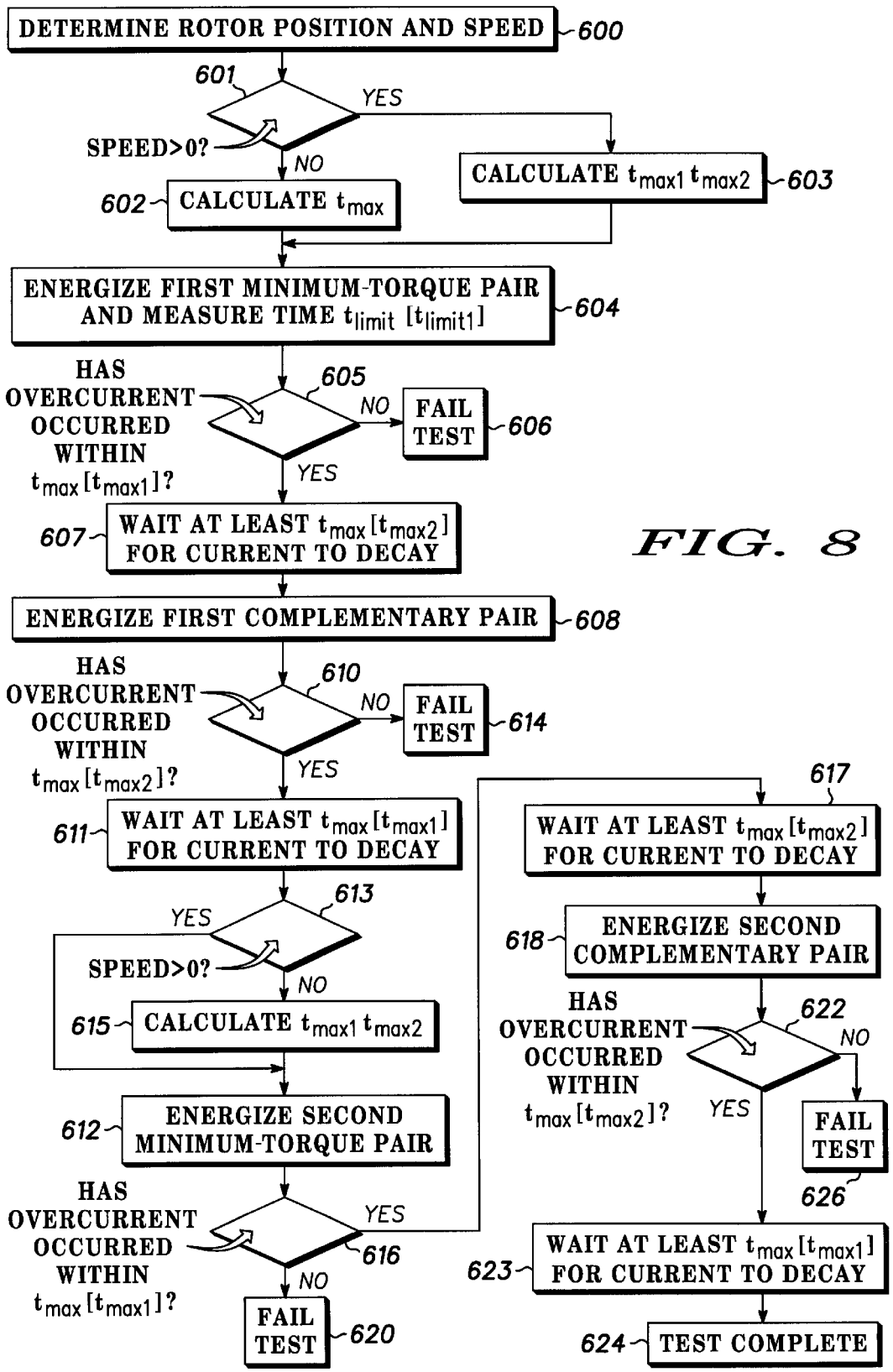
FIG. 8 is a flow chart of a continuity checking method in accordance with the invention.

FIG. 8 illustrates a flow chart that describes a preferred method for checking the continuity of the motor 104, switches 106a–f, motor relay 110 and interconnecting leads 122a–c, for the above-described system. The method also produces minimum torque to the motor shaft 426 to minimize the steering wheel torque a driver feels during the test. For exemplary purposes, the method will be described for a brushless dc motor and six Hall effect position sensors. Of course, this method could also be used with other motor and sensor combinations, such as a synchronous motor and a resolver, or by using position estimation, as known by those skilled in the art.

The method preferably begins by determining the position of the motor shaft 426 at step 600, using, for example, the Hall sensors. The Hall sensors are normally used to indicate which pair of switches 106a–f to switch to produce maximum torque in a particular direction, clockwise or counterclockwise. The remaining two pair of switches could be energized as separate pairs to generate a minimum torque. According to the preferred embodiments, a minimum torque is desirable because the driver will be less likely to feel a steering wheel torque during the relay test at power-on. Thus, by identifying where the shaft 426 is located, it can be determined which two pair of switches 106a–f to turn on in order to produce a minimum torque on the shaft 426.

Figures 9, 11, 12:
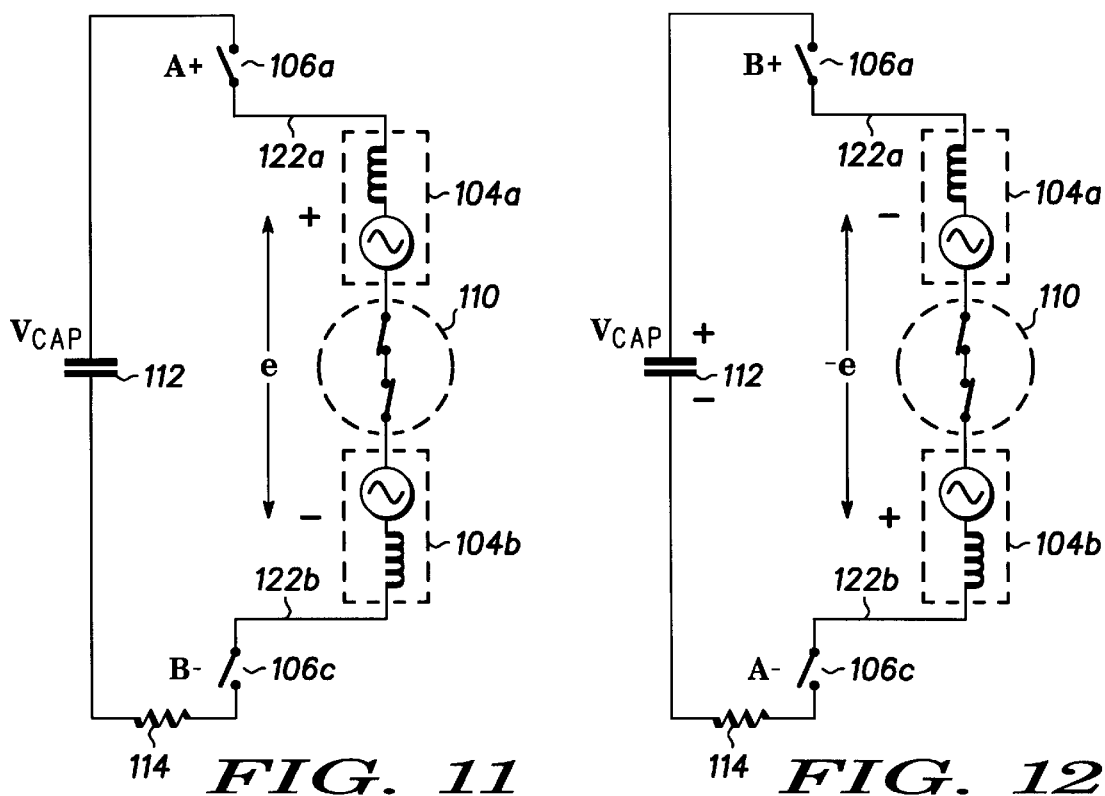
FIG. 9 is an exemplary truth table showing switches of FIG. 7 that produce maximum torque depending on motor shaft position (represented in binary)
FIG. 11 shows a partial schematic of the circuit shown in FIG. 7.
FIG. 12 shows a partial schematic of the circuit shown in FIG. 7.

Referring also to FIG. 9, an exemplary typical truth table for producing maximum torque is shown for a brushless motor and Hall sensors for detecting the motor's shaft position. For this example, eight possible states exist, two of which (000 and 111) are illegal. Of course other variations of the truth table could be used.

Depending on the initial shaft position, one switch pair will produce maximum torque. For example, if the position sensors indicate an initial position of 001, then the B, C pair will produce the maximum torque for accelerating the motor 104, B–, C+ for clockwise rotation and B+, C– for counterclockwise rotation. Consequently, the A, B pair and the A, C pair are preferably used to perform the continuity test because that pair produces a torque which is considerably less than that produced by the B, C pair. The choice of using either the A, B pair or the A, C pair to produce minimum torque is arbitrary and does not affect the present method. The characteristic of the position sensing scheme is that the motor position is accurately identified within a 60 degree sector.

Sensing devices other than Hall effect may be used, such as an optical slotted wheel with a number of slots and corresponding optical devices, to produce output similar to the Hall effect sensors.

Figure 10:
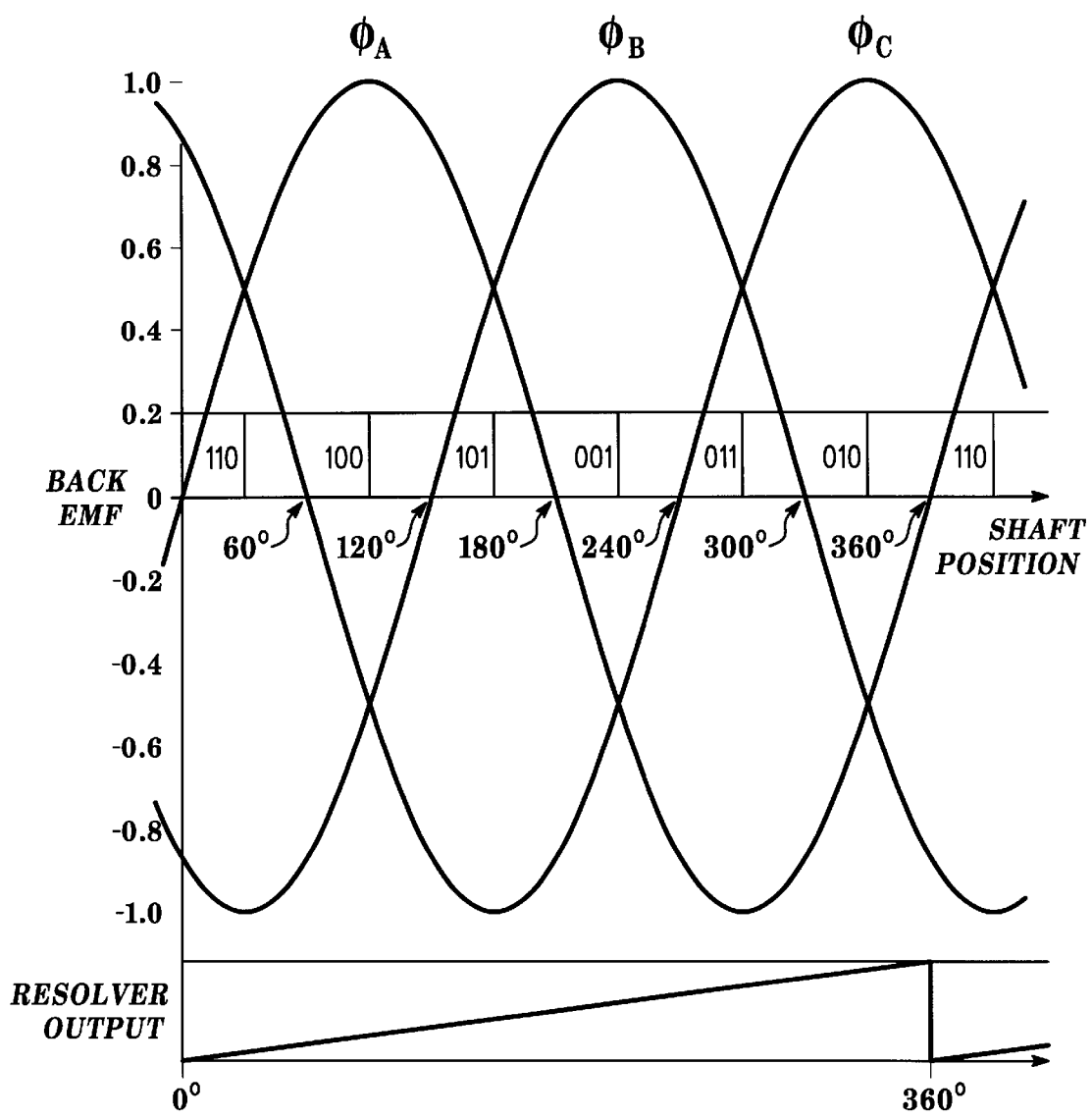
FIG. 10 is a plot of a resolver output and shaft position over time.

Referring to FIG. 10, if different type of position sensor other than the 60 degree Hall effect sensor is used, such as a resolver, it is advantageous to reconstruct the Hall effect output signals to use the method described herein. The signal reconstruction is implemented, for example, in software, hardware or firmware, depending on system constraints. As shown, if the positive zero cross signal for the back emf of phase A, for example, coincides with the resolver zero degree output signal, valid Hall effect signals are preferably centered on the zero cross points of each back emf, as illustrated.

To minimize torque felt by the driver, identification of the Hall effect position sensor signals in relation to the resolver signal allows the minimum torque sectors to be located once the maximum torque sectors are located. For example, in the 30° to 90° region, switches C⁻, A⁺ (represented by 100 binary in FIG. 9) correspond to maximum torque and in the 90° to 150° region, switches B⁻, A⁺ (101 binary) produce max torque. It should be appreciated that the continuity test produces the correct result if another scheme is used to locate these Hall segments, but torques produced by each current pulse are not minimized.

To perform the motor relay test, a dc current limit, $I_{max}$ in FIG. 7, is set on the comparator 430 to about four percent, for example, of the maximum current utilized during normal operation of the system. For example, in a seventy-five Ampere system, $I_{max}$ is set, using the controller 410, to about 3 Amperes. The operational amplifier 500 is preferably used in conjunction with resistors 502, 504 to set the gain on the amplifier 434 so that a low voltage read across the sense resistor 114 is increased to a level that is well above the offset voltage of the comparator 430. For example, if a sense resistor of 4 milli-Ohms is used, a current of 3 Amperes produces a voltage of 0.012 Volts. An amplifier gain of 10 increases this voltage to 0.12 Volts, to be used as one of the comparator 430 inputs.

Referring again to FIG. 8, the controller 410 determines if the motor shaft 426 speed is greater than zero at step 601. If the motor shaft 426 speed is not greater than zero, maximum time $t_{max}$ for an amplified sensed current, $I_{sense-amp}$, to exceed $I_{max}$ is next calculated at step 602. The time which it takes for an amplified sensed current, $I_{sense-amp}$ to exceed the reduced value of $I_{max}$, previously set to three Amperes by example, depends on the capacitor 112 voltage, motor inductance, motor and switch resistance, motor back emf and if the motor is rotating. The resistances in the circuit have a negligible effect on the current rise time because the current is relatively small. The time for $I_{sense-amp}$ to reach $I_{max}$, designated $t_{limit}$, is first calculated assuming the motor shaft is stationary. In this case the back emf is zero, and the time to reach $I_{max}$ is given as $t_{limit} = L^* I_{max}/V_{cap}$, where L is the phase-to-phase inductance in Henrys and $V_{cap}$ is the capacitor voltage in Volts. For a robust system, part-to-part variations in motor parameters and tolerances in voltage readings are preferably accounted for. As a result, the maximum time $t_{max}$ to exceed $I_{max}$ is calculated, for example, as twice $t_{limit}$. If the pulse-by-pulse circuit is not activated by $t_{max}$, the circuit continuity test has failed. For example, if the inductance is 48 microHenrys, $I_{max}$ is 3 Amperes and $V_{cap}$ is 12 Volts, $t_{limit}$ equals 12 microseconds and $t_{max}$ equals 24 microseconds.

If motor shaft 426 speed is greater than zero, e.g., when the motor is moving during the continuity test, $t_{max1}$ and $t_{max2}$ are calculated at step 603. A back emf develops across the motor terminals which depends on the rotational speed and the motor shaft 426. The back emf affects the rate of change of motor current and it also modifies the necessary time to reach the current threshold $I_{max}$. As in a previous example, the initial shaft position is 001, for example, and the B, C switch pair generate maximum torque.

Referring also to FIG. 11, a partial schematic is shown of the electronic power steering system 204 shown in FIG. 7. If the $A^+$, $B^-$ switch pair is switched as the first pair to conduct a current, the current conduction path is provided as shown, and the back emf is indicated. In this case, the time to reach $I_{max}$ is calculated as $t_{limit1} = L*I_{max}/(V_{cap}-e)$, where e is the combined back emf across the motor phases 104a and 104b. Preferably, the worst case back emf is determined, which occurs if the test is performed when the motor position coincides with the peak of the back emf. The peak back emf is determined by offline tests, familiar to those skilled in the art. When the dc current exceeds $I_{max}$, the switches $A^+$, $B^-$ are turned off and current decays through the diodes 130 of the $A^-$, $B^-$ pair. As a safety margin, $t_{max1}$ is set to $2*t_{limit1}$.

Referring to FIG. 12, the time for the current to decay through $A^-$, $B^+$ is calculated using $t_{limit2} = L*I_{max}/(V_{cap}+e)$, where the motor phase 104b connects with the positive side of capacitor 112, as shown in FIG. 12. As a safety margin, $t_{max2}$ is set to $2*t_{limit2}$. Those skilled in the art will appreciate that the times $t_{limit1}$ and $t_{limit2}$ are the same when the motor is stationary because the back emf (e) is zero. Those skilled in the art will also appreciate that the polarity of the back emf shown in FIGS. 11 and 12 may be reversed and the method described above will also apply, with (-e) replacing e in $t_{limit1}$ and $t_{limit2}$ expressions.

To perform the continuity test, two switches are turned on according to that pair that produces a minimum torque, at step 604, one upper switch 106a–c, e.g., A+ switch 106a, and one lower switch 106d–f, e.g., B– switch 106e. Preferably each switch is turned on for a time that is long enough, e.g., by a factor of two, to trip the comparator 430. The offset voltage of the comparator 430 and amplifier 500 is reduced to near zero by using known circuit techniques because the voltage across the sense resistor 114 is relatively low at low current levels, as known by those skilled in the art.

Figure 13:
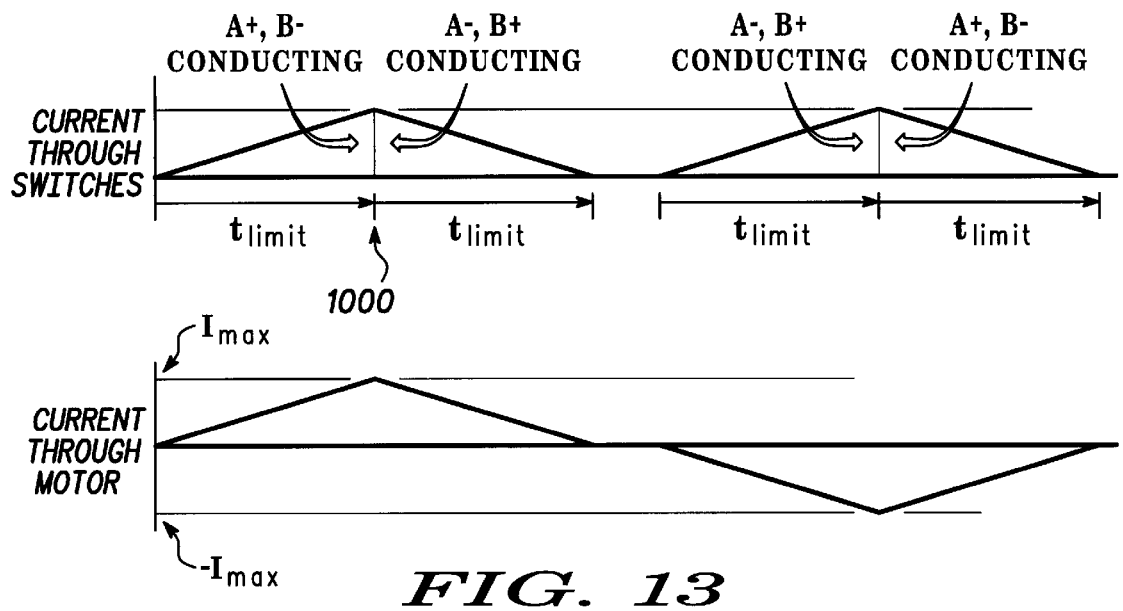
FIG. 13 is an exemplary signal diagram of current through a switch pair and motor current versus time for a stationary motor.
Figure 14:
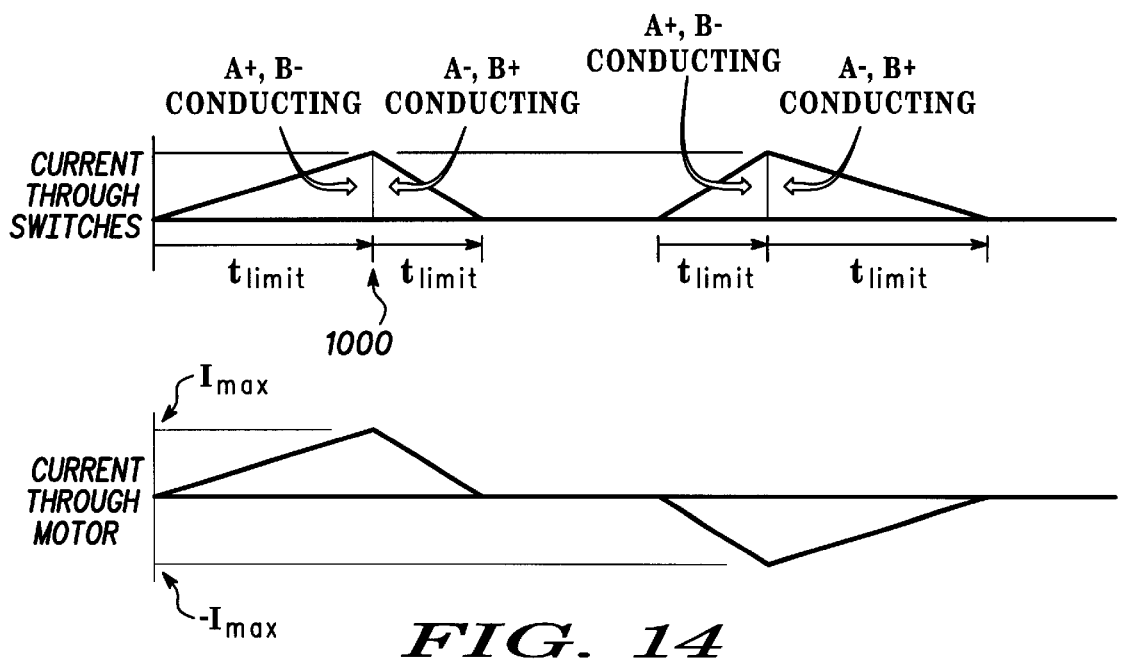
FIG. 14 is a signal diagram of current through a switch pair and motor current versus time for a moving motor.

Referring to FIG. 13, current through the switches A+, B– and torque imposed on the motor 104 is shown when the motor shaft 426 is stationary. Referring to FIG. 14, current through the switches A+, B– and torque imposed on the motor 104 is shown when the motor shaft 426 is rotating. Since the average torque on the shaft is calculated as $T_{avg} = 0.5*(t_{limit1}+t_{limit2})*I_{max}$, the torque on the motor during the first part of the test is opposite that during the second half because the current direction through the motor is reversed, shown in FIG. 14.

When the switch pair A+, B– is turned off (as shown at point 1000 in FIGS. 13 and 14), the motor inductance contained in motor phases 104a and 104b maintains current flow through the diode 130 part of the complementary switch pair A–, B–, until the current reaches zero. Thereafter, the current remains at zero until the complementary pair of switches A–, B– are switched, as described below.

If $I_{sense-amp}$, the amplified sense current, exceeds the overcurrent value $I_{max}$ at step 605 within the determined time $t_{max}$ ($t_{max1}$ if the motor shaft 426 was initially moving) circuit continuity through part of the motor, inverter and motor relay 110 is verified. Otherwise the motor relay continuity test has failed as indicated at step 606. Thereafter, current is allowed to decay through diodes 130 for a determined time $t_{max}$ ($t_{max2}$ if the motor shaft 426 was initially moving), at step 607. Thereafter, if the circuit continuity test is passed, the complementary pair of switches, in the example, A–, B+, are turned on at step 608. Activating the complementary pair of switches produces an equal and opposite torque to the first pair, to produce a net torque of about zero as experienced by the driver. If an overcurrent event occurs within time $t_{max}$ ($t_{max2}$ if the motor shaft 426 was initially moving) at step 610 the test continues at step 611, otherwise the test fails at step 614. If the test continues at step 611, current is allowed to decay through diodes 130 for time period $t_{max}$ ($t_{max1}$ if the motor shaft 426 was initially moving).

If the motor shaft 426 was initially moving at step 613, the maximum determined time $t_{max1}$ and $t_{max2}$ are calculated for the second set of switches at step 615. The time it takes for the current to reach $I_{max}$ when the second set of switches, e.g., the complementary pair A–, B+, are energized is $t_{limit2}$, and the time for that current to decay is $t_{limit1}$. Again, $t_{max1}$ equals $2*t_{limit1}$ and $t_{max2}$ equals $2*t_{limit2}$. In either case, to ensure that circuit continuity is verified for all voltage phases, the method continues by activating a second set of switches 106a–f at step 612. For example, the A+, C– pair is now energized to confirm continuity in other phases.

If an overcurrent event occurs within the time period $t_{max}$ ($t_{max1}$ if the motor shaft 426 was initially moving) at step 616 the test continues at step 617, otherwise the test fails at step 620. If the test continues, a time period $t_{max}$ ($t_{max2}$ if the motor shaft 426 was initially moving) is allowed to elapse to allow for current to decay at step 617. Thereafter, complementary switches A–, C+ are turned on at step 618. If an overcurrent event occurred within a determined time $t_{max}$ ($t_{max2}$ if the motor shaft 426 was initially moving) at step 622, the test continues at step 623, otherwise the test fails at step 626. If the test succeeded, current is allowed to decay for time period $t_{max}$ ($t_{max1}$ if the motor shaft 426 was initially moving) at step 623, and the test completes at step 624.

Those skilled in the art will appreciate that the test produces a net torque to the motor shaft of about zero. It is also noted that Hall sensors are not essential to this test because net zero torque is achieved by switching the complementary pair, but knowledge of motor position from the sensors reduces the torque pulses associated with each switching event.

Thus, the present method and system tests the continuity of the motor phases 104a–c without the need for added components to existing circuitry, and produces zero net torque on the motor shaft. Preferably, the method and system uses the detection of current, not voltage, as an indication of circuit continuity and does not produce a false result in the presence of steering wheel motion. As a result, the present method and system is more cost efficient than previous approaches and is more robust against steering wheel motion.

The method uses two inverter switches 106a–f, one lower switch 106a–c and one upper switch 106d–f. This method may also be implemented when three switches are energized, providing all upper switches or all lower switches are not energized simultaneously, so one lower and two upper switches or two lower and one upper switch is energized. However, the continuity is preferably tested on the phase corresponding to the switch that has one upper or one lower switch energized. The use of three switches to check circuit continuity increases performance time since isolated upper and lower switches may be tested for each switching occurrence, but not upper and lower pairs of switches. The user cannot determine that one of the upper pair or lower pair of switches was defective since either switch in the pair could be working for continuity of the circuit to exist.

It is important to note that the state of the dc relay 108 may be determined by performing the continuity test a number of times in succession. The test is preferably carried out by removing a fixed amount of charge from the capacitor 112 and determining if the voltage is reduced. If the dc relay 108 is open, the capacitor 112 voltage is reduced sufficiently to ensure that the voltage change is easily detectable. If the dc relay 108 is closed however, the charge drawn from the capacitor 112 is replenished from the battery 102. For example, with the overcurrent threshold reduced to three Amps and if the time to reach this current level is 50 micro-seconds at nominal battery voltage and no steering wheel motion, the charge drawn from the capacitor is current multiplied by time, or 3*50 micro-Coulombs (=150 uC), which includes the complementary pulse. It is assumed that the current follows a linear profile for the calculation, but other profiles may also be considered with the appropriate change in the amount of charge drawn from the capacitor. If the capacitor is sized at 3000 micro-Farads, for example, the voltage drop is change-in-charge divided by capacitance; or voltage change=$150*10^{-6}/3*10^{-3}$=0.05 V.

If a voltage change of 1 V is chosen as the difference that determines the relay state, this test is repeated 20 times to achieve a voltage drop of approximately 1 V. The voltage difference of 1 V may vary with different system configurations and design constraints and is chosen here to illustrate the application of the method. It is advantageous to perform the continuity test to minimize torque on the steering wheel due to the net zero torque of the test. Thus, the torque pulsations sensed by the driver are minimized.

The system and method can be implemented, in part, by preferably using a 68HC708MP16 micro-controller available from Motorola, Inc. or a TMS320C240 digital signal processor available from Texas Instrument, Inc.; an IR 2130 gate drive integrated circuit available from International Rectifier, Inc.; a sense resistor available from Vishay; a LM2902 op amp available from National Semiconductor, Inc.; a LM339 comparator available from National Semiconductor, Inc.; a LTC1059 tracking filter available from Linear Technology, and a #IRFP048N Metal-Oxide-Semiconductor-Field-Effect-Transistors available from International Rectifier.

It is to be understood that changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

What is claimed is:

1. A method for checking the continuity of circuitry for a power steering system, the circuitry having a plurality of switches, the method comprising:

locating the position of the motor shaft;

determining which switches of the inverter to switch to produce a minimal torque on the motor shaft;

switching the switches that produce the minimal torque on the motor shaft; and checking current flow through the switches that produce the minimal torque to determine the continuity of the circuitry.

2. The method according to claim 1, wherein checking current flow includes detecting an overcurrent event.

3. The method according to claim 2, wherein the overcurrent event is checked with a comparator.

4. The method according to claim 3, wherein the comparator compares $I_{sense-amp}$ to the $I_{max}$ to determine if an overcurrent event occurs within a determined time.

5. The method according to claim 4, wherein a value of $I_{max}$ is set to about three percent of the maximum current utilized during normal operation of the power steering system.

6. The method according to claim 5, wherein $I_{max}$ is set with a controller.

7. The method according to claim 1, wherein the check for continuity determines if at least one relay functions properly.

8. The method according to claim 7, wherein the relay is a motor relay.

9. A system for checking the continuity of circuitry for a power steering system, the circuitry having a plurality of switches, the system comprising:

a sensor that locates the position of the motor shaft;

a controller that determines which switches of the inverter to switch to produce a minimal torque on the motor shaft, wherein the controller switches the switches that produce the minimal torque on the motor shaft; and a comparator that checks current flow through the switches that produce the minimal torque to determine the continuity of the circuitry.

10. The system according to claim 9, wherein the comparator checks current flow by detecting an overcurrent event.

11. The system according to claim 10, wherein the comparator compare $I_{sense-amp}$ to the $I_{max}$ to determine if an overcurrent event occurs within a determined time.

12. The system according to claim 11, wherein a value of $I_{max}$ is set to about three percent of the maximum current utilized during normal operation of the power steering system.

13. The system according to claim 12, wherein $I_{max}$ is set with the controller.

14. The system according to claim 9, wherein the sensor is a Hall effect current sensor.

15. The system according to claim 9, wherein the sensor is a resolver.

16. The system according to claim 9, wherein the controller utilizes a truth table to determine which switches will produce the minimum torque on the motor shaft.

17. The system according to claim 9, wherein the check for continuity determines if at least one relay functions properly.

18. The system according to claim 17, wherein the relay is a motor relay.

* * * * *